UNITED STATES PATENT OFFICE.

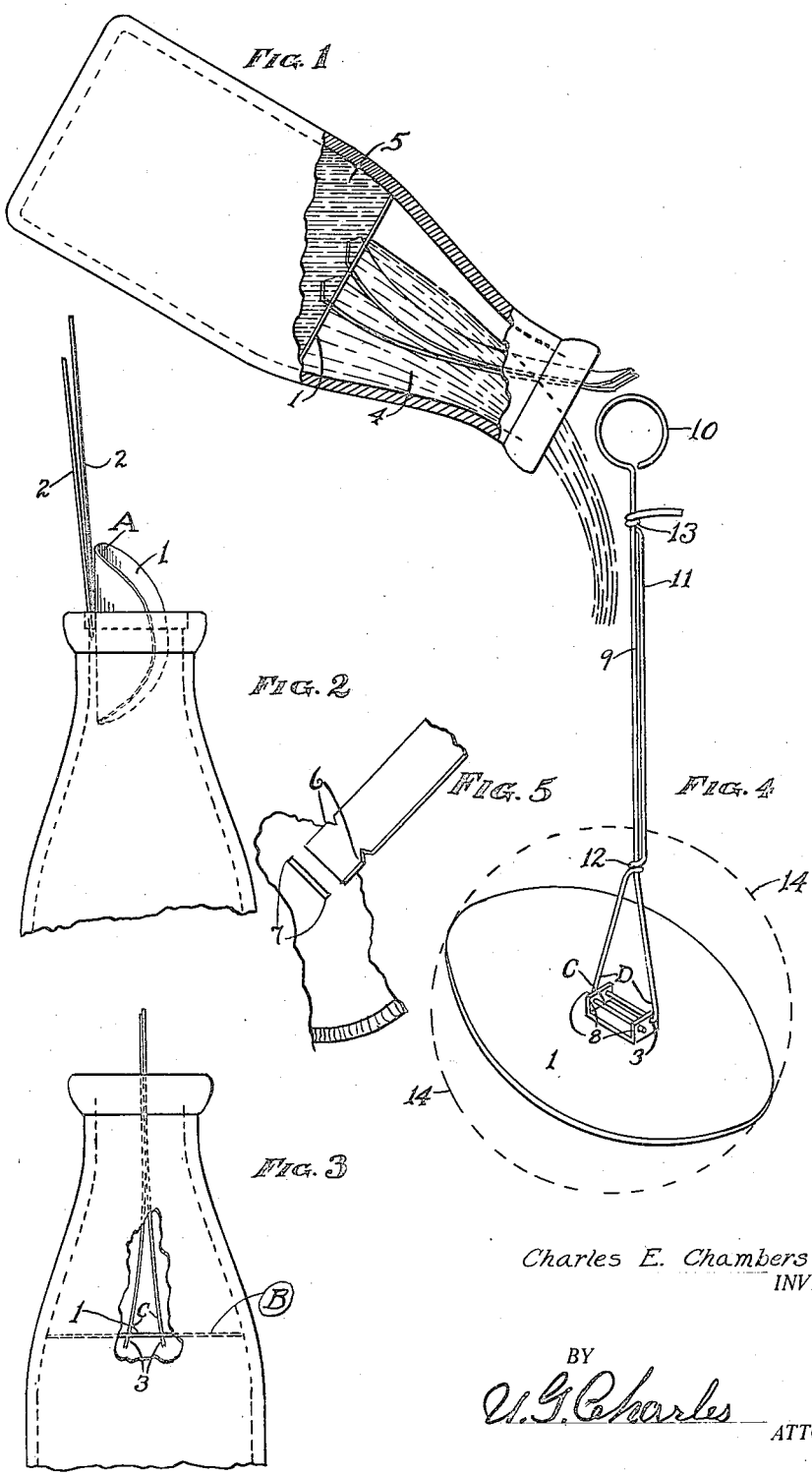

CHARLES E. CHAMBERS, OF WICHITA, KANSAS.

MILK SKIMMER.

1,421,909.  Specification of Letters Patent.  Patented July 4, 1922.

Application filed December 13, 1920. Serial No. 430,362.

*To all whom it may concern:*

Be it known that I, CHARLES E. CHAMBERS, a citizen of the United States, and resident of Wichita, in the county Sedgwick and State of Kansas, have invented certain new and useful Improvements in Milk Skimmers, of which the following is a description.

The object of my improvement is to separate cream from milk after it has been stored in bottles, pouring the cream out and leaving the milk in the bottle.

Another object of my improvement is to provide a simple device that is sanitary, easily cleaned and can be used many times, and for this purpose reference will be had to the modified drawing hereinafter explained.

I also claim that my skimmer can be made of paper or other similar material, and inexpensive to manufacture and being adapted to fold the transportation packages may contain a large number in a reduced size package.

With these and other objects in view my invention will be described in detail by referring to the drawings in which—

Fig. 1 is a view of a bottle with my skimmer in place and as it would appear while pouring the cream, a part of the bottle in section for convenience of illustration. Fig. 2 is a view showing the skimmer partially folded as required to enter the mouth of the bottle. Fig. 3 is a view showing the skimmer transversely located in the bottle approximately where the line would be between the cream and milk. Fig. 4 is a modified drawing in case the arms are made of wire and the disc of a more substantial material as, of rubber or other similar material. Fig. 5 is a detail view of one of the arms and fragmentary part of the disc with slot adapted to engage said arm.

My skimmer consists of a flexible disc 1 having two arms 2 hingedly attached to said disc at 3 the edges or periphery of said disc may be tapering to a feather edge the object of which is to conform readily to the inner walls of the bottle as the disc is pulled upward along the incline of said bottle by which means a tight separation is made between the cream 4 and the milk 5 at which time the cream may be poured out and the milk remaining in the bottle below the disc, 1.

To enter my skimmer through the neck of milk bottle and to pass it through the accumulated cream I will immerse the disc 1 of the skimmer in pure water the object of which is to prevent the cream from sticking to said disc, and by taking the two arms 2 between thumb and finger and sliding them in opposite directions the disc member is made to stand parallel with said arms and then by pressing the edges of the disc to a curved position as shown at A in Fig. 2 the skimmer will enter the bottle freely passing through the cream and when the disc member 1 is well below the bottom of accumulated cream, I then by an opposite sliding movement of arms 2 will force the disc at right angles to said arms as shown at B in Fig. 3 and the disc 1 being of flexible material will straighten out in a flat form, and more particularly so when pulled upward in the diminishing walls of said bottle at which time the flexible periphery of disc 1 will close tightly against the walls of the bottle in a horizontal position and the said horizontal position is actuated by the separated hinged positions of the arms as shown at C in Figs. 3 and 4, and also by width of the arms having notched edges as shown at 6 said notches engaging the ends of slot in disc at 7 said arms being the depth of notches wider than said slot, and likewise by the spread of the wire D in Fig. 4.

For a permanent skimmer it may be made as per description of Fig. 4 having a wire arm composed of two members pivotally mounted to ears 8, said ears being imbedded in the rubber of said disc and one of said arms 9 having a ring 10 and the adjacent arm 11 being wrapped around arm 9 as shown at 12 and 13 is adapted to slide, by which means the skimmer disc is turned in parallel alignment as shown by dotted lines 14 and the process of passing the disc through the mouth of a milk bottle will be as heretofore described and shown in Fig. 2.

Having thus described my invention I would have it understood that I do not base my claims on the materials to be used in the construction of my skimmer, but what I do claim and desire to secure by Letter Patent, subject to such modifications as lie within the scope of the appended claims, is—

1. In a milk skimmer, a flexible disk having a pair of slots arranged adjacent to and on opposite sides of the center of said disk and in parallelism with each other; two arm members, one for each slot, each comprising a longitudinal strip with a pair of notches oppositely arranged in the side edges of each strip and near the lower end thereof, the said notches of each strip engaging, respectively, the outer portions of its slot and whereby the lower end elements of said strips extend below said disk in spaced apart planes, while the upper end portions extend above the disk as handle elements.

2. In a milk skimmer, a flexible disk having a pair of slots arranged adjacent to and on opposite sides of the center of said disk and in parallelism with each other; two arm members, one for each slot, each comprising a longitudinal strip with a pair of notches oppositely arranged in the side edges of each strip and near the lower end thereof, the said notches of each strip engaging, respectively, the outer portions of its slot and whereby the lower end elements of said strips extend below said disk in spaced apart planes, while the upper end portions extend above the disk as handle elements; the upper handle elements being susceptible of movement in opposite directions and in parallelism with each other, to pivot said disk into parallelism therewith and whereby the lower end elements of said arms below the disk are brought into a contiguous relationship with each other from their former spaced apart relationship.

CHARLES E. CHAMBERS.

Witnesses:
M. Y. CHARLES,
W. A. NETHERCOT.